United States Patent
Chan et al.

(10) Patent No.: US 9,001,470 B1
(45) Date of Patent: Apr. 7, 2015

(54) FLEXIBLE PRINTED CIRCUIT BOARD STIFFENER FOR HARD DISK DRIVE

(71) Applicant: HGST Netherlands B.V., Amsterdam (NL)

(72) Inventors: Andre Chan, Palo Alto, CA (US); Raymond Quines, San Jose, CA (US); Edgar Rothenberg, San Jose, CA (US); Taeyong Yoon, San Jose, CA (US)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 14/109,741

(22) Filed: Dec. 17, 2013

(51) Int. Cl.
*G11B 5/55* (2006.01)
*G11B 5/127* (2006.01)

(52) U.S. Cl.
CPC .................................. *G11B 5/127* (2013.01)

(58) Field of Classification Search
USPC ........................................... 360/264.1–264.2
See application file for complete search history.

(56) References Cited

U.S. PATENT DOCUMENTS

| | | | |
|---|---|---|---|
| 5,615,068 A | 3/1997 | Matsuda et al. | |
| 5,680,277 A * | 10/1997 | Bonn et al. | 360/264.2 |
| 5,796,556 A | 8/1998 | Boutaghou | |
| 6,104,572 A | 8/2000 | Williams et al. | |
| 6,236,533 B1 | 5/2001 | Forbord et al. | |
| 6,937,442 B2 | 8/2005 | Zhao et al. | |
| 7,149,054 B1 | 12/2006 | Davis et al. | |
| 7,271,345 B2 | 9/2007 | Freeman et al. | |
| 7,649,718 B1 | 1/2010 | Edwards | |
| 7,787,219 B2 * | 8/2010 | Chan et al. | 360/265.7 |
| 8,111,485 B2 * | 2/2012 | Freeman et al. | 360/264.2 |
| 2010/0123976 A1 * | 5/2010 | Freeman et al. | 360/264.2 |

OTHER PUBLICATIONS

Gross et al., "The effects of actuator arm geometry on airflow and read/write head off-track vibration in a modeled hard disk drive. Part I: the effects of actuator arm thickness" Magnetics Conference, 2005. INTERMAG Asia 2005. Digests of the IEEE International , vol., no., pp. 127,128, Apr. 4-8, 2005.

Yip et al., "Behavior of Spiral Flow Structures Along the Trailing Edges of E-Block Arms Under Increasing Airflow Velocities," Magnetics, IEEE Transactions on , vol. 42, No. 10, pp. 2591,2593, Oct. 2006.

* cited by examiner

*Primary Examiner* — Brian Miller
*Assistant Examiner* — Carlos E Garcia
(74) *Attorney, Agent, or Firm* — Kunzler Law Group, PC (57) ABSTRACT

Described herein is a magnetic storage device that includes at least one magnetic disk, at least one armature rotatably movable relative to the at least one magnetic disk, and a transducer head coupled to the armature. The magnetic storage device further includes a stiffener that is coupled to the armature. The stiffener includes at least one arm having a flexible printed circuit board (FPCB) portion and a deflection portion angled relative to the FPCB portion. The magnetic storage device also includes an FPCB coupled to the stiffener.

16 Claims, 4 Drawing Sheets

FLEXIBLE PRINTED CIRCUIT BOARD STIFFENER FOR HARD DISK DRIVE

FIELD

This disclosure relates generally to electronic information storage apparatus, and more particularly to reducing vibrations of and drag on a rotary actuator of an electronic information storage apparatus.

BACKGROUND

Hard disk drives ("HDDs") are widely used to store digital data or electronic information for enterprise data processing systems, computer workstations, portable computing devices, digital audio players, digital video players, and the like. Generally, HDDs store data on a disk with a layer of magnetic material. A transducer head, e.g., read-write head, includes a writing component that magnetically polarizes areas or bits of the magnetic material with one or two polarities to encode either binary zeros or ones. Thus, data is recorded as magnetically encoded areas or bits of magnetic polarity. The direction of the magnetization points in different directions, which can be referred to as a positive state and a negative state. Each bit can store information (generally binary information in the form of either a 1 or a 0) according to the magnetic polarization state of the bit. Typically, bits are arranged along respective radially-adjacent (e.g., concentric) annular tracks of a disk. A single disk can include space for millions of tracks each with millions of bits. A transducer head also includes a reading component that detects the magnetic polarity of each bit or area and generates an electrical signal that approximates the magnetic polarity. The signal is processed to recover the binary data recorded on the magnetic material.

The disks of an HDD rotate as transducer heads hover over the respective disks to read data from and write data to the disks. Rotation of the disks is driven by a spindle motor that is rotatably coupled to the disks via a central spindle. The position of the transducer heads relative to the disks, and the location on the disks from which data is read or to which data is written, is controlled via actuation of a servo motor. The servo motor is co-rotatably coupled to a plurality of armatures each securing a respective one of the transducer heads. As the disks rotate, the servo motor actuates to rotate the armatures and move the transducer heads radially inwardly or outwardly over the disks.

Some conventional HDDs use a flexible printed circuit board (FPCB) to communicate commands to the servo motor and transducer head, and receive data read by the transducer head. Because the armatures of HDDs move during operation, an FPCB may be necessary to accommodate secure communications with the servo motor and transducer head. Due to the flexible properties of the FPCB, certain conventional HDDS employ a stiffener bracket or coupling that securely couples the FPCB to the transducer head.

SUMMARY

A need exists for an apparatus, system, and method for controlling the vibration and drag of the servo motor and armatures of an HDD that overcomes the shortcomings of conventional HDDs. For example, with conventional HDDs, the rotation of the disks generates air flow off of the disks that may impact the armatures and negatively affect the ability of the spindle motor to accurately and efficiently position the transducer heads over the disks. Generally, rotation of the co-rotating disks produces primary flow in a circumferential direction and secondary flow in radial and axial directions, particularly in an outer region (e.g., proximate the outer edge boundaries) of the disks. The flow induces vibrations in the armatures and servo motor, which may lead to read/write offset during reading and writing operations. Additionally, the flow may increase drag on the armatures and servo motor as the servo motor moves the armatures, which reduces the efficiency and increases the power consumption of the HDD. Conventional stiffener brackets tend to magnify the vibrations and drag induced by flow from the rotating disks.

The subject matter of the present application has been developed in response to the present state of HDD art, and in particular, in response to problems and needs in the art, such as those discussed above, that have not yet been fully solved by currently available HDDs. For example, in some embodiments, the present disclosure has been developed to provide an apparatus, system, and method for reducing vibration of and drag on the armatures and servo motor of an HDD due to disk-induced flow, and correspondingly reducing read/write offset and increasing efficiency. In this manner, according to some embodiments, the present disclosure overcomes at least some of the shortcomings of the prior art.

According to one embodiment, a magnetic storage device includes at least one magnetic disk, at least one armature rotatably movable relative to the at least one magnetic disk, and a transducer head coupled to the armature. The magnetic storage device further includes a stiffener that is coupled to the armature. The stiffener includes at least one arm having a flexible printed circuit board (FPCB) portion and a deflection portion angled relative to the FPCB portion. The magnetic storage device also includes an FPCB coupled to the stiffener.

In some implementations of the magnetic storage device, the at least one arm of the stiffener includes a bend portion between the FPCB portion and the deflection portion. An acute angle can be defined between the FPCB portion and the deflection portion. In certain implementations, the at least one magnetic disk has a circular-shaped outer periphery, and the deflection portion extends tangentially relative to the circular-shaped outer periphery. The at least one magnetic disk can rotate in a first direction, and the deflection portion may extend away from the FPCB portion in the first direction.

According to some implementations of the magnetic storage device, the deflection portion is curved. A curvature of the deflection portion may correspond with a curvature of circular-shaped outer periphery of the at least one magnetic disk.

In certain implementations, the magnetic storage device includes a plurality of magnetic disks and a plurality of armatures. The stiffener can include a plurality of spaced-apart arms. The plurality of arms can be spaced apart axially relative to central axes of the plurality of magnetic disks. The FPCB may include a plurality of arms each mounted to a respective one of the plurality of arms of the stiffener.

According to another embodiment, an FPCB stiffener for a magnetic storage device includes a base and a plurality of spaced-apart arms extending from the base. Each arm includes an FPCB portion and a deflection portion angled relative to the FPCB portion.

In some implementations of the FPCB stiffener, the base includes a substantially flat plate, wherein the FPCB portion of each arm extends parallel to the flat plate and the deflection portion of each arm extends at an angle relative to the flat plate. In certain implementations, the deflection portion of each arm is curved. Each arm can have a bend that separates the FPCB portion from the deflection portion. According to some implementations, an acute angle is defined between the FPCB portion and deflection portion of each arm. In certain implementations, each arm of the stiffener has a substantially V-shape In certain implementations, the FPCB stiffener also includes an FPCB receiver extending from a first side of the base that is opposite a second side of the base. The plurality of arms extends from the second side of the base. The FPCB receiver extends in a first direction away from the base and the deflection portion extends in a second direction away from the base. The first direction can be substantially opposite the second direction.

According to yet another embodiment, an actuator assembly for a magnetic storage device includes a plurality of vertically-stacked armatures co-rotatably driven by a servo motor. The actuator assembly also includes a stiffener coupled to the plurality of vertically-stacked armatures. The stiffener includes a base plate and a plurality of arms extending from the base plate. The plurality of arms each includes an FPCB portion and a deflection portion that is angled with respect to the FPCB portion. The base plate and FPCB portions of the arms are positioned along a side of the plurality of vertically-stacked armatures. The deflection portions of the arms are positioned and extend transversely between adjacently-stacked armatures. The actuator assembly further includes an FPCB that includes a base portion and a plurality of arms. The base portion is supported on the base plate of the stiffener and each of the plurality of arms of the FPCB is supported on a respective one of the plurality of arms of the stiffener.

In certain implementations, the actuator assembly includes an FPCB bracket that is spaced apart from the plurality of vertically-stacked armatures. The FPCB is coupled to the FPCB bracket at a first end portion of the FPCB and coupled to the stiffener at a second end portion of the FPCB.

Reference throughout this specification to features, advantages, or similar language does not imply that all of the features and advantages that may be realized with the present disclosure should be or are in any single embodiment of the invention. Rather, language referring to the features and advantages is understood to mean that a specific feature, advantage, or characteristic described in connection with an embodiment is included in at least one embodiment of the subject matter disclosed herein. Thus, discussion of the features and advantages, and similar language, throughout this specification may, but do not necessarily, refer to the same embodiment.

The described features, structures, advantages, and/or characteristics of the subject matter of the present disclosure may be combined in any suitable manner in one or more embodiments and/or implementations. In the following description, numerous specific details are provided to impart a thorough understanding of embodiments of the subject matter of the present disclosure. One skilled in the relevant art will recognize that the subject matter of the present disclosure may be practiced without one or more of the specific features, details, components, materials, and/or methods of a particular embodiment or implementation. In other instances, additional features and advantages may be recognized in certain embodiments and/or implementations that may not be present in all embodiments or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the disclosure will be readily understood, a more particular description of the disclosure briefly described above will be rendered by reference to specific embodiments that are illustrated in the appended drawings. Understanding that these drawings depict only typical embodiments of the disclosure and are not therefore to be considered to be limiting of its scope, the subject matter of the present application will be described and explained with additional specificity and detail through the use of the accompanying drawings, in which.

DETAILED DESCRIPTION

Figure 1:
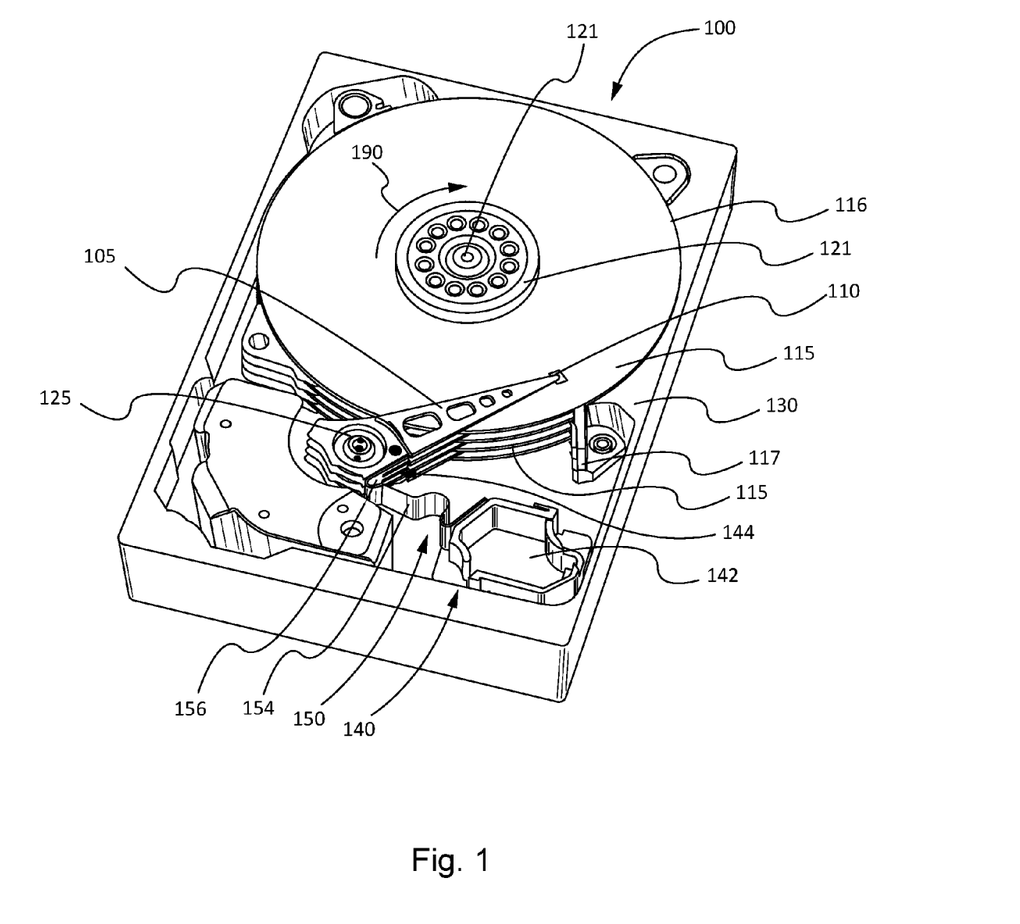
FIG. 1 is a perspective view of a magnetic storage device according to one embodiment.

Referring to FIG. 1, a magnetic storage device 100, according to one embodiment, is depicted as a hard disk drive (HDD). However, in other embodiments, the magnetic storage device 100 can be another type of magnetic storage device. The HDD 100 includes armatures 105, transducer heads, such as transducer head 110, one or more disks 115, a spindle 120 driven by a spindle motor (not shown), a servo motor 125, and a base 130. The HDD 100 can also include a cover (shown removed) that couples to the base 130 to form an enclosed housing. Each transducer head 110 is secured to an end portion of a respective armature 105 (a second transducer head attached to lower armatures is not shown). Although the HDD 100 is shown having five armatures 105, one transducer head 110 per armature, five disks 115, one spindle 120, and one servo 125, any number of armatures, heads, disks, spindles, and servos may be employed.

The spindle 120 is operably connected to the base 130 via a spindle motor coupled to the base. The spindle 120 is co-rotatably coupled to the spindle motor such that the spindle motor rotatably drives the spindle. Accordingly, the spindle 120 can be considered to be part of or integral with the spindle motor. The disks 115 are operably connected to the spindle 121 via respective hubs 121 fixedly secured to respective disks and co-rotatably coupled to the spindle. In this manner, the spindle 120 defines a central axis of each disk 115. As the spindle 120 rotates, the disks 115 correspondingly rotate. Accordingly, the spindle motor can be operatively controlled to rotate the disks 115 a controlled amount and at a controlled rate.

As the disks 115 rotate, the servo motor 125 positions the armatures 105 and the heads 110 connected to each armature, such that the heads are positioned over a specified radial area of the disks for read or write operations. The servo motor 125 is co-rotatably coupled to a servo base or actuator body 146. For example, the servo motor 125 may be positioned within the servo base. The plurality of armatures 105 are coupled to and extend away from the servo base 146 in a spaced-apart manner. The armatures 105 are spaced an equi-distance apart from each other and extend parallel relative to each other. In an idle mode, the servo motor 125 is controlled to position the armatures radially outwardly, as indicated by the directional arrow, such that each head is parked or unloaded onto a ramp support 117 secured to the base.

The HDD 100 may also include an electrical hardware board mounted to the base 130. In this manner, the electrical hardware board is on-board or contained within the HDD 100, as opposed to forming part of an electrical device external to or separate from the HDD. Generally, the electrical hardware board includes hardware and/or circuitry used to control operation of the various components of the HDD 100. The electrical hardware board may include a printed circuit board on or in which the hardware and/or circuitry is mounted.

At least a portion of the electrical hardware board is electrically coupled to an actuator assembly 140 of the HDD 100. The actuator assembly 140 includes the servo motor 125, servo base 146, armatures 105, and a flexible printed circuit board (FPCB) 150 with electrical components 158 and electrical communication lines formed or mounted to a flexible printed circuit ribbon or substrate 151. The FPCB 150 facilitates the transmission of commands and data between the servo 125 and transducer heads 110, and the electrical hardware board of the HDD 100. The FPCB 150 includes a bracket portion 152, an intermediate portion 154, and a stiffener portion 156. The intermediate portion 154 is between the bracket and stiffener portions 152, 156, and is configured to flex as the armatures 105 move during operation. The bracket portion 152 is secured to a mounting bracket 142, which is secured to the base 130 of the HDD 100. In certain implementations, the mounting bracket 142 includes an FPCB receiver 148 for receiving and retaining a bend of the bracket portion 152 of the FPCB 150. The FPCB receiver 148 can define a partially enclosed channel that receives in nesting engagement the bend of the bracket portion. The rest of the bracket portion 152 of the FPCB 150 is secured to a sidewall of the mounting bracket 142. Electrical leads (not shown) in the bracket portion 152 of the FPCB 150 are electrically coupled to corresponding leads of the electrical hardware board.

The stiffener portion 156 of the FPCB 150 includes a plurality of electrical components 158 and is secured to a stiffener 144 of the actuator assembly 140. The stiffener 144 is secured to a side of the servo base 146 using any of various coupling techniques, such as fastening with one or more fasteners (e.g., fastener 145). The stiffener 144 includes a base 172 (see, e.g., FIGS. 5 and 6). The base 172 is a substantial flat plate-like element with a length and width of the plate-like element being significantly larger than a thickness of the plate-like element. As shown, the base 172 may include apertures 174 for receiving respective fasteners used to secure the base of the stiffener 144 directly to the servo base 146. The base 172, in some implementations, sits relatively flush against an outer surface of the servo base 146.

Figure 5:
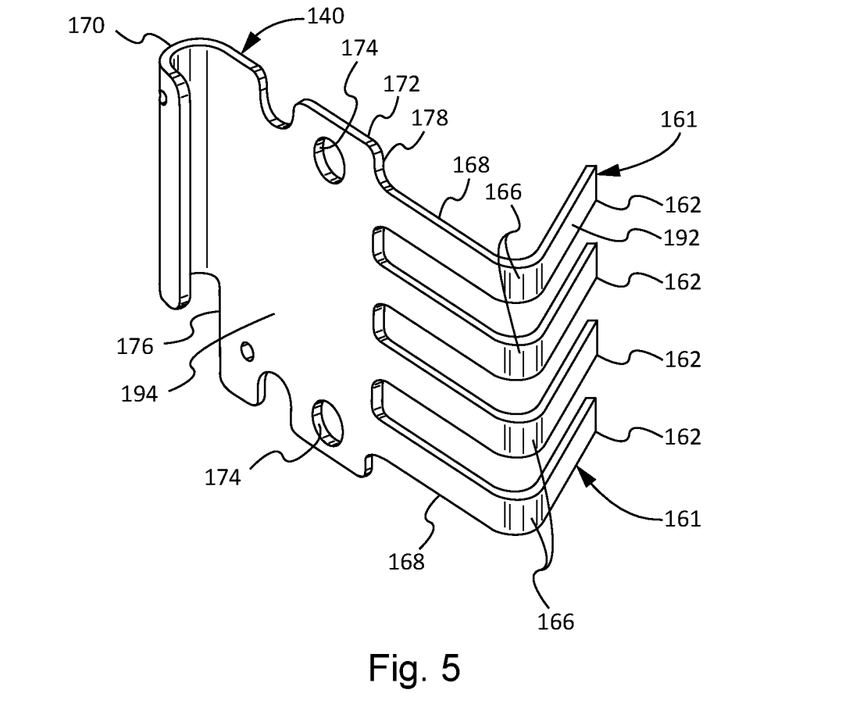
FIG. 5 is a perspective view of a flexible printed circuit board (FPCB) stiffener of a rotary actuator system according to one embodiment.
Figure 6:
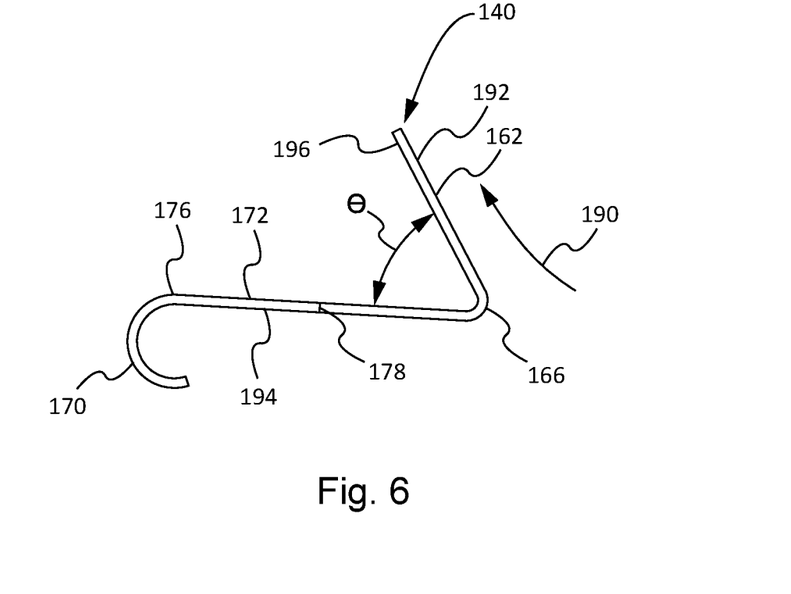
FIG. 6 is a top plan view of the FPCB stiffener of FIG. 5.

The stiffener 144 also includes an FPCB receiver 170 for receiving and retaining a bend of the stiffener portion 156 of the FPCB 150. The FPCB receiver 170 extends transversely from and is positioned proximate a proximal side 176 of the base 172 of the stiffener 144. The FPCB receiver 170 of the stiffener 144 can define a partially enclosed channel that receives in nesting engagement the bend of the stiffener portion. The channel may be defined by a curved surface of the FPCB receiver 170. The FPCB receiver 170 extends exteriorly away from an exterior surface 194 of the stiffener 144. The exterior surface 194 faces away from the servo base 146 when the stiffener 144 is secured to the base, such that the FPCB receiver 170 extends away from servo base and the armatures 105.

Extending from a distal side 178 of the base 172 of the stiffener 144 is a plurality of cantilevered arms 161. The distal side 178 of the base 172 is substantially opposite the proximal side 176 of the base. Each arm 161 is an elongate length of material that has a length much greater than a width or thickness. The arms 161 can be spaced-apart an equal distance along the distal side 178 of the base 172 in some implementations. According to yet certain implementations, the configuration (e.g., length, width, and/or thickness) of each arm 161 is the same. Generally, each of the arms 161 extends away from the base 172 in a first direction parallel to the base (e.g., parallel to the exterior surface 194 of the base) and then bends sharply to extend toward the base in a second direction that is acutely angled relative to the first direction. In this manner, each arm 161 is substantially V-shaped. More specifically, each arm 161 includes a deflection portion 162, a bend 166 or bent portion, and an FPCB portion 168.

The FPCB portion 168 is coupled directly to or extends directly from the base 172 of the stiffener 144. Furthermore, the FPCB portion 168 is elongate in the first direction, which is parallel to the base. The length of the FPCB portion 168 of each arm 161 is dependent on the configuration of the HDD 100 and the position of an outer periphery 116 of the disks 115. Generally, the length of the FPCB portion 168 is selected to position the deflection portion 162 along the outer periphery 116 of a corresponding disk 115 in a spaced-apart manner to form a gap 180 between the outer periphery and the deflection portion.

The bend 166 facilitates the transition from the deflection portion 162 to the FPCB portion 168. More specifically, the bend 166 provides the relatively abrupt redirection of the deflection portion 162 relative to the FPCB portion 168 of each arm 161. In some implementations, the bend 166 is sharp (e.g., has a small radius of curvature). In other implementations, the bend 166 is blunter (e.g., has a larger radius of curvature). Generally, the radius of curvature of the bend 166 is selected to reduce flow stagnation and turbulence at the leading edge of the bend. As shown in FIG. 6, the bend 166 redirects the deflection portion 162 relative to the FPCB portion 168 such that an acute angle $\theta$ is defined between the deflection portion and the FPCB portion. In some implementations, the angle $\theta$ is between about 20-degrees and 90-degrees. In one implementation, the angle $\theta$ is between about 40-degrees and about 70-degrees.

The deflection portion 162 of each arm 161 is coupled directly to or extends directly from the bend 166 of the arm. The deflection portion 162 is elongate in the second direction, which extends back towards the base. The deflection portion 162 can have any of various lengths extending between a fixed end coupled to the bend 166 to a free end away from the bend. Generally, the length of the deflection portion 162 is selected to provide a desirably long gap 180 between the outer periphery 116 of an associated disk 115 and a deflection surface 192 of the deflection portion. In some implementations, the length of the deflection portion 162 is about the same as the FPCB portion 168. In yet some implementations, the length of the deflection portion 162 is at least half a width of the armatures 105. The length of the deflection portion 162 and the angle $\theta$ may be dependent on any of various factors, such as a minimally required radial clearance or gap between the deflection portion and outer periphery of the disks when the armatures are in a radially innermost position on the disks.

Figure 3:
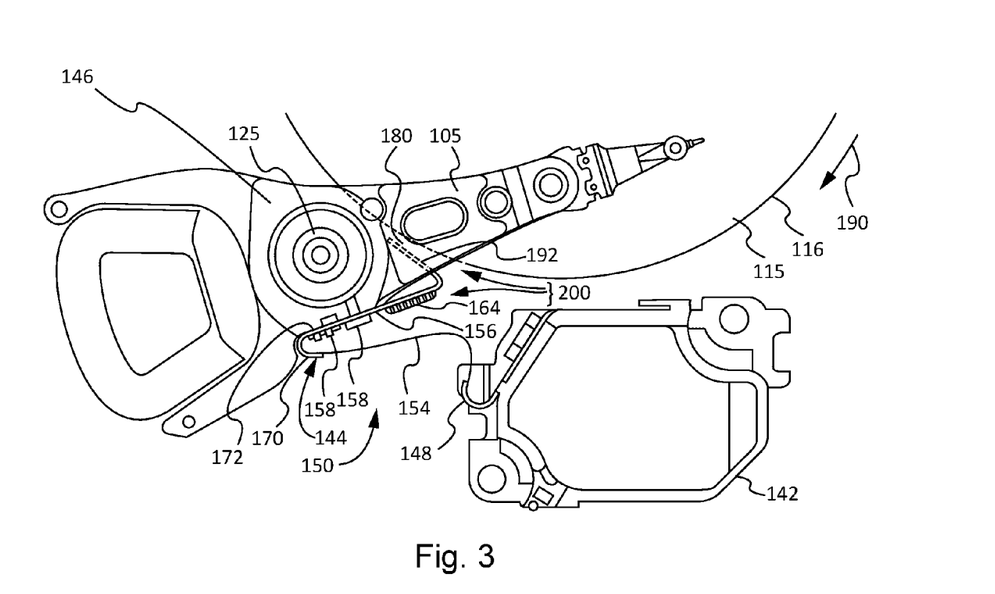
FIG. 3 is a top plan view of a rotary actuator system and magnetic storage disk of a magnetic storage device according to one embodiment.
Figure 4:
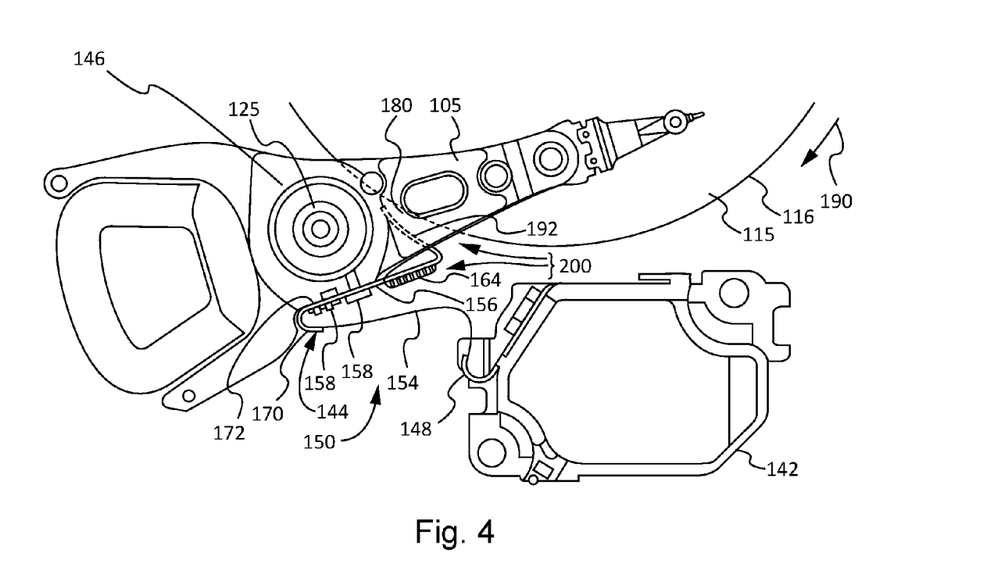
FIG. 4 is a top plan view of a rotary actuator system and magnetic storage disk of a magnetic storage device according to another embodiment.

The deflection surface 192 of the deflection portion 162 faces the outer periphery 116 of an adjacent disk 105 when the stiffener 144 is secured to the servo base 146. Furthermore, each deflection portion 162 includes a back surface 196 that is substantially opposite the deflection surface 192. In some implementations, the deflection surface 192 is substantially flat or linear (see, e.g., FIG. 3). However, in other implementations, the deflection surface 192 is curved or concave (see, e.g., FIG. 4). The back surface 196 can be flat or curved corresponding with or independent of the configuration of the deflection surface 192. In one implementation, both the deflection and back surfaces 192, 196 of the deflection portion 162 are flat, and in another implementation, both the deflection and back surfaces 192, 196 of the deflection portion 162 are curved (e.g., the deflection surface is concave and the back surface is convex).

Generally, the stiffener 144 is configured to be more rigid or stiff than the FPCB 150 so as to rigidly support the FPCB in place. Accordingly, the stiffener 144 is made from a relatively rigid material, such as metal, composite, hardened plastic, ceramic, and the like. The stiffener 144 can have a monolithic one-piece construction, or be made from two or more separately-formed parts that are coupled together. Furthermore, any of various manufacturing techniques can be used to make the stiffener 144, such as casting, molding, machining, stamping, and bending. In one implementation, the stiffener 144 is stamped, punched, or cut from a flat, thin sheet of material. Then, the deflection portion 162 of the arms 161 are bent in a bending process.

Figure 2:
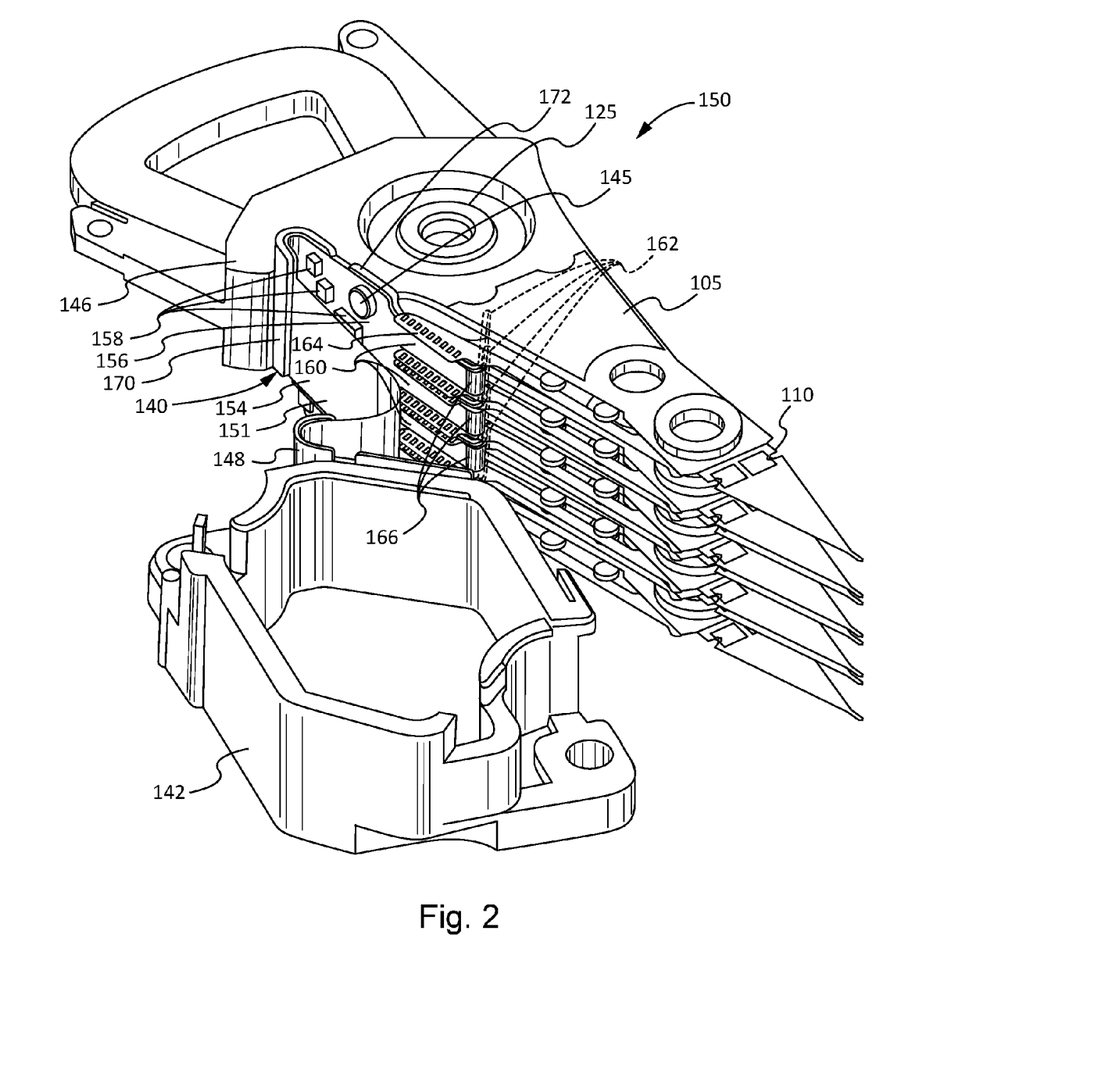
FIG. 2 is a perspective view of a rotary actuator system of a magnetic storage device according to one embodiment.

Referring to FIG. 2, the stiffener 144 is secured to the servo base 146 and the stiffener portion 156 of the FPCB 150 is secured to the stiffener. More specifically, in some implementations, the stiffener 144 is secured directly to an exterior surface of the servo base 146, and the stiffener portion 156 is secured directly to the exterior surface of the base 172 of the stiffener. The stiffener portion 156 of the FPCB 150 can be secured to the stiffener 144 via one or more fasteners, such as the fastener 145, that cooperatively secures the stiffener to the servo base 146.

Additionally, the stiffener portion 156 includes a plurality of spaced-apart arms 160 extending parallel to each other. The configuration of the arms 160 of the FPCB 150 corresponds generally with the configuration of the FPCB portions 168 of the arms 161 of the stiffener 144. For example, the arms 160 are sized, shaped, and spaced apart in the same manner as the FPCB portions 168 of the arms 161. Accordingly, each arm 160 is aligned with and overlays the FPCB portion 168 of a respective arm 161, and each space between the arms 160 is aligned with a respective space between the arms 161. The arms 160 of the FPCB 150 can be secured to the FPCB portion 168 of the arms 161 of the stiffener 144 using any of various techniques, such as fastening, adhesive, and the like. In the illustrated embodiment, the arms 160 of the FPCB 150 are not secured to or do not cover the bends 166 and deflection portions 162 of the stiffener 144. Furthermore, the stiffener portion 156 of the FPCB 150, base 172 of the stiffener 144, and FPCB portion 168 of the arms 161 are positioned adjacent or on the side of the servo base and/or armatures 105. In other words, in some implementations, the stiffener portion 156 of the FPCB 150, base 172 of the stiffener 144, and FPCB portion 168 of the arms 161 are not positioned or do not extend between the armatures 105.

Each arm 160 of the FPCB 150 includes one or more electrical communication lines (not shown) that are electrically coupleable to a respective one of a set of electrical leads or traces 164 associated with a respective armature 105. In other words, each armature 105 includes or is associated with electrical circuitry (e.g., an integrated lead suspension) that is on-board the armature. The electrical circuitry of each armature 105 includes a separate set of electrical leads 164.

When secured to the servo base 146, the deflection portion 162 of the arms is positioned or extends between the armatures 105. The disks 115 rotate in a rotational direction 190 relative to the actuator assembly 140. From the perspective shown in the figures, the rotational direction 190 is a clockwise direction. As mentioned above, rotation of the disks 115 induces a tangential or circumferential air flow 200 as air sheds off of the outer periphery 116 of the disks. The tangential air flow 200 flows substantially tangentially to the outer periphery 116 of the disks. In other words, the tangential air flow 200 flows substantially parallel to the rotational direction 190 with the velocity and tangentiality of the tangential air flow decreasing in a radially outwardly direction from a maximum velocity and tangentiality at the outer periphery 116. Although not shown, rotation of the disks 115 may also induce an axial air flow that flows substantially perpendicularly to the tangential air flow.

The stiffener 144 is secured to a leading or upstream side of the servo base 146 facing the rotational direction 190 or the tangential air flow 200. In this manner, the base 172 and FPCB portion 168 of the arms 161 of the stiffener 144, and the stiffener portion 156 and arms 160 of the FPCB 150, face the oncoming tangential air flow 200. The impact of the tangential air flow 200 against the base 172, FPCB portion 168 of the arms 161, stiffener portion 156, and arms 160, which act as broad-faced obstruction to the air flow, tends to induce vibrations in and drag on the armatures 105 via a sailing effect. However, the inclusion of the bend 166 and deflection portion 162 in the arms 161 of the stiffener assist in reducing the sailing effect, and associated vibrations and drag, caused by the FPCB 150 and stiffener 144 by streamlining the actuator assembly 140. The deflection portion 162 extends in the rotational direction 190 from the fixed end coupled to the bend 166 to the free end away from the bend. The elongate gap 180 or flow channel defined by the deflection portion 162 of the arms 161 and the outer periphery 116 of the disks 115 provides a low-resistance path through which tangential air flow 200 may flow, which preserves the momentum of the flow and decreases the velocity and pressure of the air flow impacting the FPCB 150 and stiffener 144. Accordingly, the deflection portion 162 acts to reduce vibrations by decreasing the magnitude of velocity and pressure fluctuations and reduce drag by decreasing the magnitude of the velocity and pressure of the flow impacting the FPCB 150 and stiffener 144.

Additionally, the deflection portion 162 acts as a barrier to reduce the impact of axial flow and radial flow on the actuator assembly 140, including the armatures 105. This is accomplished, in some implementations, by mounting the deflection portions 162 such that a distal end portion of the deflection portion 162 abuts or contacts the servo base 146 (see, e.g., FIGS. 3 and 4). For example, the length of the deflection portion 162 and angle θ can be selected such that when the stiffener 140 is assembled in place relative to the servo base 146, the distal end portion rests on the surface of the servo base. In yet some implementations, a material (e.g., an adhesive) can be applied between the distal end portion of the deflection portion 162 and the servo base 146. With the distal end portion of the deflection portion 162 abutting the servo base 146, air flow is prevented or restricted from passing between the distal end portion of the deflection portion and the servo base.

An additional advantage of the stiffener 144 arms 161 having deflection portions 162 as described herein is that the additional surface area provided by the deflection portions 162, without adding substantial mass or weight to the actuator assembly 140, facilitates head conduction away from the stiffener and heat dissipation from the stiffener via forced convection.

Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment.

In the above description, certain terms may be used such as "up," "down," "upper," "lower," "horizontal," "vertical," "left," "right," and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two."

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Also, securing one element to another element can include direct and indirect securing. Additionally, as used herein, "adjacent" does not necessarily denote contact (i.e., one element can be adjacent to another without being in contact with the other).

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

The subject matter of the present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:

1. A magnetic storage device, comprising:
   at least one magnetic disk having a circular-shaped outer periphery;
   at least one armature rotatably movable relative to the at least one magnetic disk;
   a transducer head coupled to the armature;
   a stiffener coupled to the armature, the stiffener comprising at least one arm having a flexible printed circuit board (FPCB) portion and a deflection portion angled relative to the FPCB portion, the deflection portion extending from the FPCB portion tangentially relative to the circular-shaped outer periphery of the at least one magnetic disk, wherein the deflection portion comprises a deflection surface facing the at least one magnetic disk and a back surface opposing the deflection surface, and wherein an entirety of the deflection surface and the back surface define an acute angle with the FPCB portion; and
   an FPCB coupled to the stiffener.

2. The magnetic storage device of claim 1, wherein the at least one arm of the stiffener comprises a bend portion between the FPCB portion and the deflection portion.

3. The magnetic storage device of claim 1, wherein the deflection portion is curved.

4. The magnetic storage device of claim 3, wherein a curvature of the deflection portion corresponds with a curvature of circular-shaped outer periphery of the at least one magnetic disk.

5. The magnetic storage device of claim 1, wherein the at least one magnetic disk rotates in a first direction, and wherein the deflection portion extends away from the FPCB portion in the first direction.

6. The magnetic storage device of claim 1, further comprising a plurality of magnetic disks and a plurality of armatures, and wherein the stiffener comprises a plurality of spaced-apart arms.

7. The magnetic storage device of claim 6, wherein the plurality of arms are spaced apart axially relative to central axes of the plurality of magnetic disks.

8. The magnetic storage device of claim 6, wherein the FPCB comprises a plurality of arms each mounted to a respective one of the plurality of arms of the stiffener.

9. A flexible printed circuit board (FPCB) stiffener for a magnetic storage device, comprising:
   a base; and
   a plurality of spaced-apart arms extending from the base, each arm comprising an FPCB portion and a deflection portion angled relative to the FPCB portion;
   further comprising a FPCB receiver extending from a first side of the base, the plurality of arms extending from a second side of the base, wherein the first side is opposite the second side; and
   wherein the FPCB receiver extends in a first direction away from the base and the deflection portion extends in a second direction away from the base, the first direction being substantially opposite the second direction.

10. The FPCB stiffener of claim 9, wherein the base comprises a substantially flat plate, wherein the FPCB portion of each arm extends parallel to the flat plate and the deflection portion of each arm extends at an angle relative to the flat plate.

11. The FPCB stiffener of claim 9, wherein the deflection portion of each arm is curved.

12. The FPCB stiffener of claim 9, wherein each arm comprises a bend that separates the FPCB portion from the deflection portion.

13. The FPCB stiffener of claim 9, wherein an acute angle is defined between the FPCB portion and deflection portion of each arm.

14. The FPCB stiffener of claim 9, wherein each arm of the stiffener has a substantially V-shape.

15. An actuator assembly for a magnetic storage device, comprising:
- a plurality of vertically-stacked armatures co-rotatably driven by a servo motor;
- a stiffener coupled to the plurality of vertically-stacked armatures, the stiffener comprising a base plate and a plurality of arms extending lengthwise from the base plate, wherein the plurality of arms each comprises a flexible printed circuit board (FPCB) portion and a deflection portion that is angled with respect to the FPCB portion, wherein a width of the FPCB portion is the same as the width of the deflection portion and a thickness of the FPCB portion is the same as the thickness of the deflection portion, and wherein the base plate and FPCB portions of the arms are positioned along a side of the plurality of vertically-stacked armatures, and wherein the deflection portions of the arms are positioned and extend transversely between adjacently-stacked armatures; and
- an FPCB comprising a base portion and a plurality of arms, wherein the base portion is supported on the base plate of the stiffener and each of the plurality of arms of the FPCB is supported on a respective one of the plurality of arms of the stiffener.

16. The actuator assembly of claim 15, further comprising an FPCB bracket spaced apart from the plurality of vertically-stacked armatures, wherein the FPCB is coupled to the FPCB bracket at a first end portion of the FPCB and coupled to the stiffener at a second end portion of the FPCB.

* * * * *